(No Model.)

J. B. PUGH.
CAR COUPLING.

No. 262,980. Patented Aug. 22, 1882.

WITNESSES
Jacob W. Loeper
O. M. Randall

INVENTOR
Jesse B. Pugh
By C. P. Jacobs, Atty.

N. PETERS. Photo-Lithographer, Washington, D. C.

UNITED STATES PATENT OFFICE.

JESSE B. PUGH, OF INDIANAPOLIS, INDIANA, ASSIGNOR OF ONE-HALF TO CHARLES O. BROWNING, OF SAME PLACE.

CAR-COUPLING.

SPECIFICATION forming part of Letters Patent No. 262,980, dated August 22, 1882.

Application filed April 20, 1882. (No model.)

*To all whom it may concern:*

Be it known that I, JESSE B. PUGH, of Indianapolis, Indiana, have invented a new and useful Improvement in Car-Couplers, of which the following is a description, reference being had to the accompanying drawings, in the several figures of which like letters represent like parts.

My invention belongs to that class of devices known as "car-couplers," and which lock automatically, and which may be unlocked from either side of the car without going in between them, thus avoiding peril to the brakeman.

Figure 1:
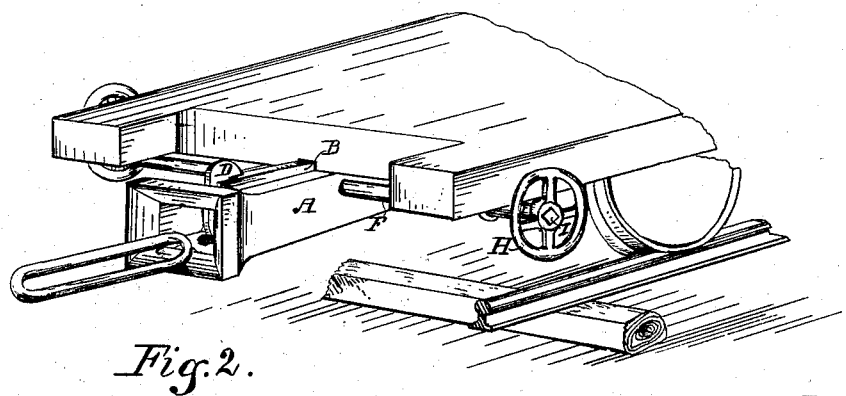
Figure 2:
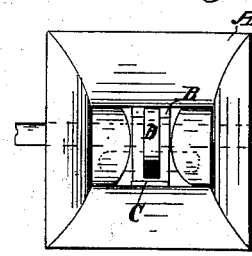
Figure 3:
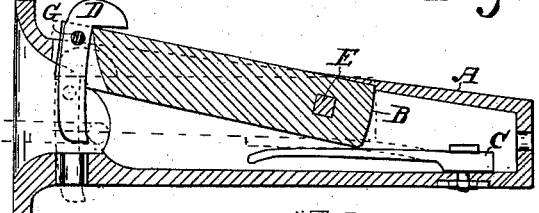

In the drawings, Figure 1 represents a perspective view of my device as attached to the end of a car. Fig. 2 is an end view of the draw-head. Fig. 3 is a longitudinal section, and Fig. 4 is a top view.

In the drawings, A is the draw-head, to the bottom of which and on the inside is attached a spring, C. The top of the draw-head is slotted, and in this slot a pin-bar, B, plays, fitting squarely upon the cross-bar F, as shown in Fig. 3 at E. The end of the pin-bar B is recessed, and a pin, D, is inserted to swing loosely therein on a pivot, G.

Figure 4:
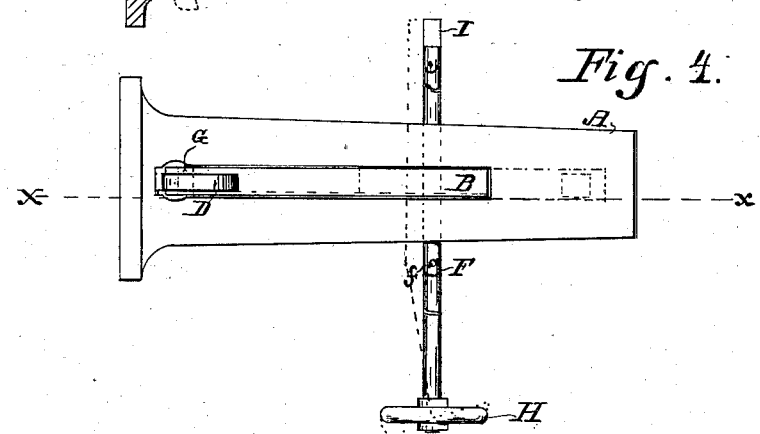

The cross-bar F, which passes through the draw-head A, is squared at either end, and upon these ends, or either of them, a rod or lever is fitted, as at the loose joint *f*, Fig. 4, and the end of this rod or lever is squared to receive a hand wheel or crank, by which it may be turned. By this means the device may be operated from either side of the car and at different angles, and when the draw-head is pushed back the cross-bar F may pass clear under the end of the car.

The curved end of the pin D may be used as a handle to lift up the pin-bar whenever necessary.

My device operates as follows: If the link be in the draw-head of the car approaching, it will, when it enters the draw-head A, strike the pin D, which will swing backward, and when the link has passed in far enough will return to its place, falling within the link, thus locking it automatically. To unlock it or uncouple the car the brakeman only need turn the wheel H. This raises the pin-bar B and pin D, and the link may be withdrawn. So, too, if the link be in the draw-head, and the draw-head of the approaching car require it, the link may be raised or lowered to fit by means of the crank and cross-bar F. The pin-bar B may be lifted up by hand and thrown back out of the way, when desired, the spring C holding it as well in that position as in any such other, as the pin-bar is so constructed that it rests upon the link when the latter is in place.

What I claim, and desire to secure by Letters Patent, is—

1. The combination of the slotted draw-head A, having an interior spring, C, the pin D, loosely pivoted in the recessed pin-bar E, and the pin-bar E, secured to the cross-bar F, by which it is operated, substantially as described.

2. In a car-coupler, a draw-head slotted on the upper side, wherein a bar carrying a loosely-pivoted pin at one end is supported by a spring, the pin-bar resting upon the coupling-link when in place, and serving to raise or lower such link when actuated by a shaft or lever passing through the pin-bar and draw-head and extended across the width of the car for unlocking the coupler from either side, substantially as specified.

In witness whereof I have hereunto set my hand this 17th day of April, 1882.

JESSE B. PUGH.

Witnesses:
C. P. JACOBS,
CHARLES O. BROWNING.